United States Patent [19]

Doulton et al.

[11] Patent Number: 4,512,667
[45] Date of Patent: Apr. 23, 1985

[54] PORTABLE INFORMATION DEVICE HAVING AN OUTPUT RELATED TO NATURAL PHYSICAL EVENTS

[76] Inventors: Romm Doulton, Residence l'Annonciade, 17th Ave. de l'Annonciade, Apt. 30, 15th Floor, Monte Carlo, Monaco; Robert A. Chapman, 27 Blyth Ave., Thatcham, Newbury, Berkshire, England

[21] Appl. No.: 440,223
[22] PCT Filed: Mar. 4, 1982
[86] PCT No.: PCT/GB82/00072
§ 371 Date: Nov. 1, 1982
§ 102(e) Date: Nov. 1, 1982
[87] PCT Pub. No.: WO82/03132
PCT Pub. Date: Sep. 16, 1982

[30] Foreign Application Priority Data

Mar. 4, 1981 [GB] United Kingdom ............... 8106859
Jun. 16, 1981 [GB] United Kingdom ............... 8118453

[51] Int. Cl.³ ................. G04B 47/00; G04B 47/06
[52] U.S. Cl. ................................. 368/10; 368/12; 368/14; 368/28; 33/355 R
[58] Field of Search ............... 368/10, 14, 12, 28; 33/204

[56] References Cited

U.S. PATENT DOCUMENTS 3,197,880 8/1965 Rice et al. ..................... 33/204

FOREIGN PATENT DOCUMENTS 2438861 10/1978 France .
53-124478 10/1978 Japan .
1597411 9/1981 United Kingdom .

Primary Examiner—Bernard Roskoski
Attorney, Agent, or Firm—Bacon & Thomas

[57] ABSTRACT

A pocket sized portable information device provides an alarm indicating Moslem prayer times. Means are provided for entering information identifying geograpical location, from which the hours of sunrise and sunset are calculated and then the prayer times. The device includes an oscillator driving a clock calendar and an interrupt time both of which are linked to a microprocessor. Codes identifying geographical locations are input via suitable key pads, resulting in geographical co-ordinate information being supplied to the microprocessor from a location ROM. By means of suitable algorithms the microprocessor calculates sunrise, sunset and the prayer times, and at the appropriate times provides an audible alarm through an amplifier and a transducer (T). The device is also provided with a compass identifying the direction towards magnetic north. Using the information from the location ROM the microprocessor calculates the deviation from magnetic north to the direction towards Mecca for the location concerned. The device can then be oriented so as to point towards Mecca, i.e. at the correct deviation from Magnetic North. An audible output is given when the orientation is correct.

24 Claims, 4 Drawing Figures

PORTABLE INFORMATION DEVICE HAVING AN OUTPUT RELATED TO NATURAL PHYSICAL EVENTS

This invention relates to a portable, e.g. pocket sized, information device. Such devices, based on micro-chip technology, are now commonplace and include calculators, alarm clocks, calendars, memo holders and so forth.

The invention is particularly concerned with a device which can give an output related to natural physical events, the times of which vary with geographical location on the earth's surface. Such output may be required for many purposes but the invention has been developed particularly, though not exclusively, to meet the requirements of those who practise the Moslem faith, of whom there are about 750 million.

In the proper observance of the practices of the Moslem faith there is a clearly defined duty to pray at prescribed times during the day, and such prayers must be said while facing in the direction of the Kaaba at Mecca. In addition, the Moslem year contains a number of Holy.Days whose occurrence is based on the Lunar calendar, and consequently is not fixed in terms of secular dates. These and other important events do not necessarily coincide in different countries. This presents problems for Moslem travellers who need to know the times for prayers and the direction of Mecca in relation to their own position. The timing of prayers varies with the position on the Earth'surface, depending generally on the times of sunrise and sunset. There is also a problem for those who wish to contact Moslems by telephone or the like, for example if it is wished to avoid making a call shortly before or during prayer time. Tables of prayer times are published, but enormous numbers would be required to cover all regions of the world.

The Moslem prayer times are determined in accordance with sunrise and sunset, but there may be other reasons for wishing to know the local time of these or other natural physical events such as movements of the stars or planets or phases of the moon. An object of the invention is to permit a person to be made aware when such an event is to occur at any particular geographical location.

Thus, according to the invention there is provided a portable information device comprising means for establishing a time base; means for entering information identifying any one of a plurality of geographical locations; means associated with the time base establishing means and the location entering means for deterining one or more points in time having a predetermined temporal relationship to the occurance at the location entered of one or more natural physical events the time of which is dependent on geographical location; and means for providing an output at the time determined.

The natural physical events could be sunrise and sunset at the location entered, and the point, in local time, could be the actual time of one of these events, a point mid-way between them, a point spaced a particular time from one of them and so forth. For use by Moslems, the device will be capable of determining a number of times throughout the day.

It could for example, automatically remind the user of the appropriate prayer times which occur five times throughout the day, e.g. Morning (Fajr), Noon (Zuhr), Afternoon (Asr), Sunset (Mahgrib) and Evening (Isha). Pre-warning of prayer times could be given at say 5 minute intervals for 20 minutes.

In general, the geographical location will be a specific zone and defined by co-ordinates of both latitude or longitude. There may however be circumstances in which only one variable needs to be considered, i.e. latitude or longitude.

The means establishing a time-base may be, for example, a prime generator clock, such as a quartz crystal oscillator or the equivalent, or a tied generator adapted to be re-set by existing timing means, e.g. time signals broadcast by a radio station or wire system.

The output may simply be in the form of alerting signals to the user at the predetermined times or may consist of predetermined subject matter at one or more times during that period. The indication may be visual and/or audible. Where visual indication is given, it may be in the form of or include pictorial subject matter and/or written subject matter, and in the latter case provision is advantageously made for display in any selected one of a number of languages/scripts. Where audible indication is given, this may be in the form of a simple warning bell, "bleep", tone or series of tones, musical sequence or a pre-recorded or voice-simulator-generated recital, e.g. of prayers or the meuzzin call. The nature of the output could vary during the day.

Entry of information identifying geographical location may be made automatically by providing the device with means for itself determining its location, e.g. by reference to fixed terrestrial data, a local or remote transmitter such as a transmitter at Mecca itself, a satellite, or a navigational system.

Preferably, however, provision is made for the entering of data by a user according to the location which he knows himself to be in. In a simple proposal, the device is provided with means for the manual entry of information directly by the user, e.g. by providing respective switch means for each of a number of locations, the switch means being labelled with a name of a zone or a major city in that zone so that the user can operate the appropriate switch. Preferably however, to enable the entry of a reasonable number of locations, the device is provided with means for the user to make a manual entry of information as to the zone in which he is currently located, e.g. by reference to a list, or map, provided with suitable codes such as international airline guide airport designations, which can be entered using a digital and/or alpha-keyboard. In another form there may be provided a map with switch means for respective time zones, or a map having zone markings in conjunction with which an electronically-linked stylus may be used. Such an arrangement may permit the use of many map overlays on a basically simple array. The arrangement could be such that a series of progressively larger scale maps could be used to identify a particular zone, so that user would e.g. first touch a country on a world map following which a map of the country would be displayed. The user could then touch a region of the country, and so forth progressively narrowing down the zone. In a still further possible arrangement the device itself may include an internal store or gazetter of place names which can be displayed, and a particular one chosen by a user, e.g. by passing through an alphabetical list using "fast", "slow" and "select" switch means. It would be possible to combine the functions of a map and gazetter so as to confirm to a user that a place chosen through the gazetter is in the correct place on a map. In an advanced form the device may be capable of dealing with direct input of latitude and longitude co-ordinates so as to cope with an infinite number of locations.

The device may include a conventional type of clock using the time base, with or without a conventional alarm and/or calendar. Advantageously the clock and calendar are adjusted automatically in accordance with the location entered, so as to display local time and date. Corrections may be necessary to take into account local summer time and the like and this may be done manually, e.g. by reference to a correction figure, code or the like listed for each location. Automatic correction could of course be provided although if internal and not, e.g. by a transmitter or the like, some problems could be encountered in view of the tendency of some countries to vary summer time and the like. Resetting of the device itself, in accordance with such changes, could however be provided. The calendar is preferably determined for many years, taking into account anomalies such as leap year.

The calendar could display holy days, days of local National importance, phases of the moon and so forth. It may be modified to take into account different Moslem calendars for particular Moslem zones; different dates of local importance for particular Moslem zones or sects; differences between Moslem and Western or other calendars, possibly with a cross reference system; and so forth.

In one embodiment, the device may provide a Moslem lunar calendar designating the standard six holy days and also the dates on which those holy days fall in the Western calendar, plus a graphic of the phases of the moon on which those days are based, e.g.:

Mawlid al-Nabi (The Prophet Mohammed's Birthday) 29th January/12 Rabia 1.
Isra al-Mairaj (The Prophet's night journey to Heaven) 10th June/27 Rajab.
Id al-Fitr (the end of Ramadan) 14-25th October/5-16 Dhui-Hijja
Muslim New Year (1st Muharram 1401) 8th November
Ashura 17 November/10 Muharram.

For relative-calendar purposes, the instrument may provide a pan-Arab national holiday calendar projection computed for, say, 100 years and displaying special days as they occur, for each of the 18 generally recognised Moslem calendars (not including Iran).

Data for all types of special days may be derived for each country, or each zone covered by the device. The data may be stored complete in a look-up table, or calculated from calendar data according to an algorithm held in software utilised in the device. It is desirable that the user should be able to obtain information about more than one zone, in order for example to be able to ensure that any business arrangements do not clash with a holiday, as well as to permit various appointment diaries to be kept in synchronism.

The number of the various kinds of zones may be varied, and would be a function of the accuracy desired. The size of a zone would preferably reduce, e.g. as Mecca is approached and a more sensitive indication of direction is required.

The clock may be capable of indicating local time, a base time such as GMT, another time such as a user's home time, Mecca time and so forth. The clock could be in 12 or 24 hour form.

Means may be provided for resetting the time base generating means, for example manually—in accordance with a time signal—or by remote control. The latter could be achieved by passing signals through the telephone system form a central base, the device having means for decoding these signals and correcting the time if necessary. Such resetting may be desirable at regular intervals to ensure accuracy, or simply when a battery is changed.

As mentioned earlier, a further requirement for Moslems is to face Mecca when saying prayers. There may be other circumstances where it is necessary to know the direction towards a particular point, or one of a number of points. For Moslems there already exist simple devices such as tables of compass direction, calibrated compasses and so forth, but these are generally cumbersome to use.

Preferably therefore, the device includes means which enable the user to orient himself reasonably accurately towards a predetermined location. For Moslem prayer purposes this would be the "Quiblah", i.e. 21.27 degrees longitude North, 39.49 degrees latitude East of Mecca and the holy nitch.

The device could simply be provided with a compass and tables of the type already known, the compass having e.g. a rotor ring which can be set to give the required bias towards Mecca. Preferably, however it includes means for ascertaining a basic terrestial direction such as magnetic North and means associated therewith for producing an output indicative of the direction from a geographical location entered into the device towards a predetermined location.

The means for ascertaining a basic terrestrial direction may be, for example, a magnetic compass, a magnetic field sensor, a pre-settable inertia guidance system, or a system based on a radio transmitter or satellite sation. The output could be given by a mechanical device such as a needle, arm, rotating dial or the like, a visual display such as a liquid crystal or LED display, or an audible output such as a tone when the device is oriented in the correct direction.

In order to determine, for example, the direction of Mecca for the purpose referred to above, it is necessary to have the basic datum direction, and a deviation indicating how far around the compass the user must turn from the datum. In one example of a datum, a magnetic compass needle is incorporated into the instrument, and viewed directly by the user. For example, the user may line up the instrument body with Magnetic North and read off the required direction from a circular scale around the needle, or an internal micro-computer may provide the user with a needle datum mark such that when the user aligns the needle with the mark, the instrument itself is aligned with Mecca. The scale required may be a simple rotatable ring, or an LCD circle which is operated by the internal computer on the basis of its current information as to its position on Earth.

In another form, a compass needle is disposed within the body of the instrument and is limited in its freedom of movement to a very narrow angle. Contacts or position sensors (magnetic or capacitative) provide the microcomputer with information as to the position of the needle on each side of a central point, so that the user can then turn the instrument until the needle is precisely centered, the instrument then indicating the correct direction.

In one preferred arrangement, a conventional magnetic compass is provided with a disc encoder which enables an electronic output to be provided indicative of the direction in which the magnet points.

In a preferred arrangement there is provided an audible signal whose amplitude or frequency varies with deviation, so that the user then needs to rotate the instrument until an audible null point or other signal indicates that the instrument is pointed to the desired direction.

It will be appreciated that with the above measures it is possible for a user to receive a warning when prayers are to be said, and to orient himself towards Mecca, simply by entering his geographical location into the device.

An important aspect of any portable information device is the manner in which the output is displayed. A common form of such device is the basic pocket calculator which comprises a housing with a liquid-crystal display on one portion, and a keyboard with touch contacts on another portion, the housing containing a battery and a micro-chip and associated electronic circuitry.

In a preferred embodiment of the present invention there is provided a new form of structure in which the display means and switching means are improved in association with each other. Thus, preferably, the device comprises a generally plate-like body which presents an electronic display zone over at least a major proportion of a front face, said display zone including regions corresponding to switch means for operation of the functions of the device by the fingers. In a preferred form the display is a liquid-crystal display, and all or substantially all of the front face of the body may be occupied by it.

The switch means may be constituted by touch-sensitive areas of the display zone, and the switching operations may be obtained, for example, by providing a conductive coating with circuitry adapted to detect a change of capacitance, a conductive coating having discrete island sites adapted to be bridged by the skin with detection of the conductivity path between the sites, a soft surface on the front face of the body capable of being distorted by pressure to cause contacting of two normally spaced conductors, or a form of piezo-electric device capable of fingertip actuation. In an alternative arrangement, whilst the front face may have means delimiting a switch area, the back face may be capable of distortion. In such an arrangement, the switch would be operated between finger and thumb for example.

The display zone would normally be a transparent, or at least translucent zone of the front face, and other switch means may be provided at another portion or portions of the front face which are made opaque.

The switch areas are advantageously "self-labelling" or "soft keys" as known in the art, so that the display zone shows a totally unmarked surface prior to placing the instrument in operation. Whilst the keys are preferably transparent, it would be possible for conventional keys to be placed adjacent the edge of the display and legends shown on the display adjacent the keys.

The displays may be for example of further keying areas, or of legends, or pictorial, or other information, or any combination thereof.

In a preferred arrangement, the device presents a totally un-lit display, e.g. black, when not in use, but presents an initial display when an "on-off" switch means on the body is operated, that initial display showing certain areas of the display zone which become switch means for further operation of the instrument. By way of example, the proper operation of one or more of the (now illuminated) switch areas may bring up on the display any one of a number of desired displays, or even two or more displays superimposed on one another.

An "on-off" switch for the instruments as a whole may again be constituted by a touch-sensitive area of any of the kinds mentioned above, and in a preferred form there may be provided an area on the body marked with, say, a logo to indicate that it is a control switch for the instrument.

The flack format might be a single sheet of glass to form both the front and back surfaces of the instrument body, the glass being the outer portion of a large LCD of which various areas are made active by suitable pattern printing of the display itself. It is known in the art that the designer of a display can use, for example, symbols made of seven segments (conventional numbers), or a complex dot matrix wherein any character is built up by a selective display of dots. In addition to such character displays, which can be selected and changed by an internal micro-computer under software control, the display can be given a number of individual areas, e.g. "flags" which are turned on or off as required. They may take the form of complete words, or pictorial representations or symbols. In the particular example of a device for those of the Moslem faith, they can take the form of complete Arabic words. In the case of use of touch-sensitive areas as a switching means, the use of "flags" is useful when the keys have only two or three specific functions which have to be selected.

As mentioned earlier, it is generally necessary for the user of the instrument to enter into the device some information as to his current position on the Earth, e.g. by use of a map displayed on the LCD. The transparent nature of an LCD permits several displays to be located under each other so that the same area of the front surface can serve for different functions without the need for complex dot formats. A lower display, or displays, may be accessed by making an upper display or displays completely transparent, using suitable slection of its electrodes.

In normal operation, a user of the device who remains in one location may expect the instrument to perform its functions each day without intervention by him. Where a pre-warning of prayer times is provided it may be desired to turn off the audible signal provided, and for this purpose a key function is made available, as also for reading actual time, or having access to diary information or other functions, e.g. when moving to a position on the Earth and needing to insert new positional information.

It is desirable to keep the number of "keys" for information entry down to a small figure, and a manner of achieving this is to use a so-called "menu" mode in which keys are used to step a display through a series of options so that the user can select his needs by use of only a limited number of keys. By way of example, for setting of time on a unit clock, time can be entered directly by operating appropriate keys of a 10-key numeric layout. Alternatively, keys may be used to increment "hours" or "minutes", or to increment or decrement the entire count at a rising rate.

Provision is advantageously made for inhibition of switch action when the user is not specifically operating the instrument. This is most readily achieved by fitting a switch into the side of the body of the instrument, and recessing it so that it can only be operated deliberately by the user.

As will be appreciated, the device will generally include a micro-computer so as to be capable of performing its various functions.

The micro-computer may be a single chip, or a pair of chips, or a multi-chip set using a micro-processor with an external programme memory. Where a second micro-computer is used, it can be arranged to run briefly only when some new calculation is required, and accordingly it is then possible to use a chip of higher capacity and speed than the first micro-chip and so attain a high level of performance without running down battery power unduly.

Multi-chip micro-computers are not normally designed to run complex displays, and therefore in accordance with a further feature there may be introduced one or more LCD driver chips which can be set up by the micro-chip under software control. Such a driver chip could be provided already attached to an LCD display.

In the particular example of the use by Moslems referred to above, a primary purpose of the instrument is to call the user's attention at appropriate times, e.g. preferably by an audible warning. A buzzer may be used, e.g. a crystal transducer in the form of a simple disc of a material which changes size under the influence of an electrical field. More elaborate forms of audible signal can be provided by known transducers which can be made to respond to a band of frequencies and so are able to provide an output of musical notes, and in general the electrical signals form which these audible signals are derived can be held in a memory system as part of the micro-processor ROM (read-only memory). Speech output may also be provided, e.g. by compressing and re-synthesizing a taped recording of a voice, or by simulating a voice artifically in known manner.

Provision is advantageously made for muting the audible signals, and for indicating that a muting mode has been selected.

Where the user is deaf, provision may be made for a vibratory output as distinct from an audible output.

The device would preferably have a self-contained power supply e.g. in the form of primary cells, but provision may be made for connection to external power services, or for re-charging of secondary cells, or for use of solar cells.

In its preferred form, the device is visually very simple and when not in use, is apparently merely a blank slab of glass with a metal edging. When activated by the user, portions of the display become visible, and "keys" are seen in accordance with the facilities which can be demanded. Basic functions are identified immediately, and are accessible directly. Functions which are used less often are accessed by the use of several keys in succession. At all levels, only those keys with an immediate purpose are shown to the user, so that at no time is there a confusing array of redundant information. The device is preferably supplied together with a gazeteer having codes for locations and/or a Koran, conveniently packaged in a suitable wallet.

An embodiment of the invention will now be described by way of example and with reference to the accompanying drawings, in which.

The device of the present embodiment is specifically designed for use by Moslems, to advise them of prayer times and of the direction towards Mecca. It is a pocket sized device, entirely portable and intended for use by travellers.

Figure 1:
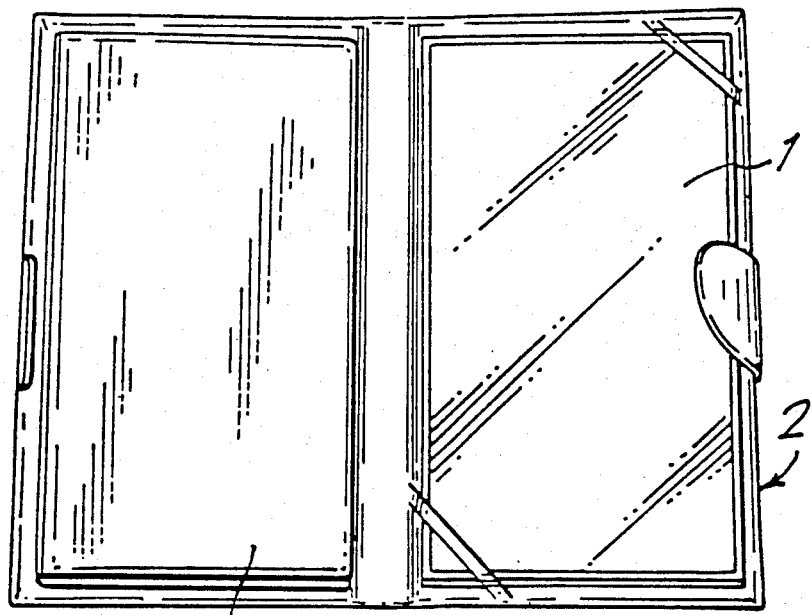
FIG. 1 is a plan view of the a device in accordance with the invention, mounted in a wallet together with a book.

As shown in FIG. 1, the device 1 is intended to be supplied in a suitable wallet 2, together with one or more books 3 such as an instruction book, a list of location codes or a copy of the Koran. The device is intended to be simple to use and to read, and to have the minimum number of switches, displays and so forth. When the device is not is use, as shown in FIG. 1, the front face of the device 1 is completely blank and in a preferred embodiment is black. The device remains in this state until a recessed on/off switch (not shown) is actuated. This switch is positioned on the side of the device adjacent the top right hand corner. There may be a permanent marking on the device to indicate top or bottom.

Figure 2:
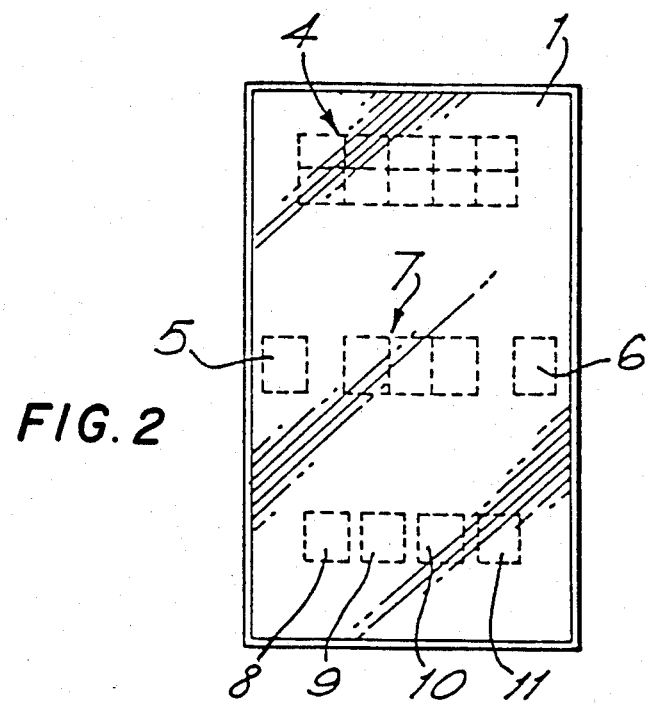
FIG. 2 is a plan view of the device alone, showing various display panels/switches.

When the on/off switch is actuated, various panels are indicated on the top surface of the device, as shown in FIG. 2. These panels carry markings such as legends, numbers, words or letters, in either Arabic or English. Panels 4 indicate particular Holy Days. There are ten such panels indicating the ten main Holy Days. For one of the Moslem sects there are only eight such Holy Days and internal adjustments, in the factory, can ensure that only eight of the panels can be activated. Panel 5 is a battery indicator which tells when battery replacement is necessary. Panel 6 is an indicator which comes on when the device requires re-setting, a procedure which will be described below. Three panels 7 can give a digital output, each with any of the numbers 0 to 9. Panel 8 is a switch for rolling the numbers in panels 7 and Panel 9 a switch for selecting and entering a number displayed in a panel 7. Panel 10 is a local/remote switch, the function of which will be described below, and Panel 11 a selector switch for changing between Arabic and English display notation. The display is entirely LCD, covering the entire front face of the device. For practical reasons it is divided into two sections. The output from panels 4 to 6 could be, e.g. by way of a dot matrix system, as could identifying labels for switch areas 8 to 11. LCD displays of this type are known in the art.

The switch areas 8 to 11 are preferably transparent touch sensitive switches. Thus, a suitable transparent conductive pattern may be printed onto the outer surface of the LCD, and a circuit provided which can detect the conductivity of the skin when that area is touched. Alternatively there may be employed a capacitative measurement arrangement in which a capacitor is printed onto the surrace, and changes of the capacitance value, in the presence of the user's finger, are detected and used to signal to the internal circuits of the device. The conductive pattern may be printed just below the surface, e.g. under a thick outer glass for protection from wear. Such switches are known in the art, and typical touch panels are manufactured by Tovenco A.G.

As will be appreciated, the device is a slim, self-contained unit which is battery powered and uses microchip technology.

Figure 3:
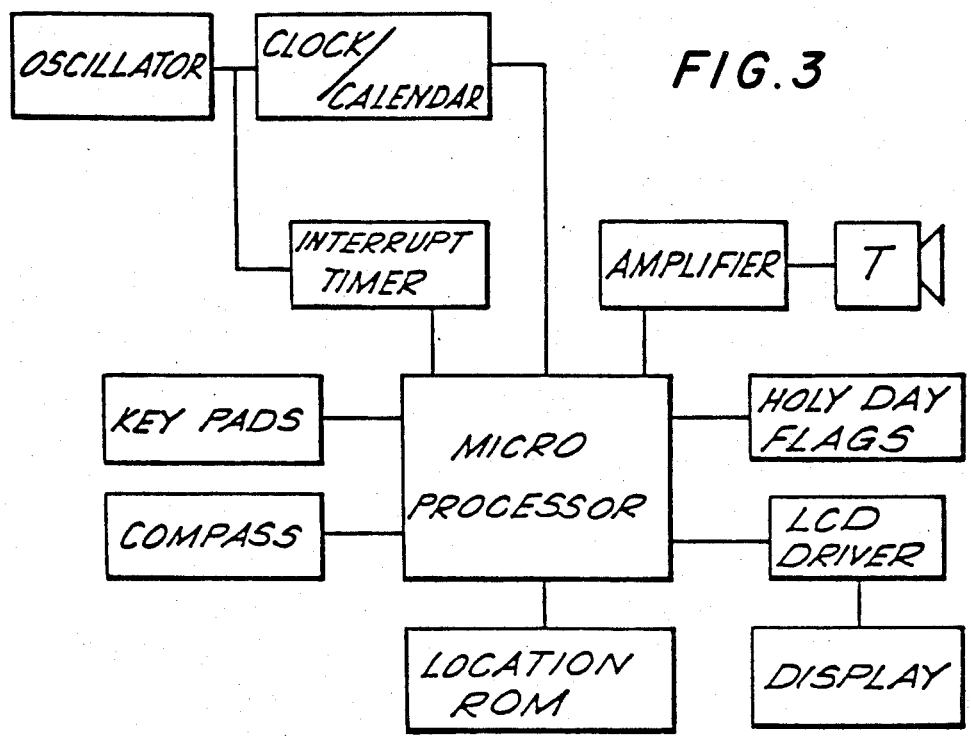
FIG. 3 is a block diagram of the circuitry of the device.

A schematic diagram of the circuitry of the device is shown in FIG. 3. The components, with the exception of a compass, are based on currently available items.

A quartz crystal controlled Oscillator, for example operating at 32 kHz drives a CLOCK/CALENDAR. This is set at, for example, GMT and provides an absolute time base. The calendar can for example be programmed for say 20 years, taking into account Leap Years and so forth. The calendar and clock are intended for internal use only and for ease of operation work in decimal days. A conventional output could, if required, be provided. The clock calendar is linked to a MICROPROCESSOR of say 10 k byte capacity, an INTERRUPT TIMER also being provided. The function of the latter is to ensure that the microprocessor reads the clock/calendar at suitable intervals so that it knows when to perform various functions.

Linked to the microprocessor are the KEY PADS, i.e. switches 8 to 11, and a LOCATION ROM (Read Only Memory). Also linked to the microprocessor are the HOLY DAY FLAGS, i.e. panels 4, and the remaining DISPLAY functions via a suitable LCD DRIVER.

The Location ROM contains latitude and longitude data for two sets of 999 pre-programmed locations. One set is "local", i.e. in the vicinity of the Middle East, and one set is remote, i.e. covering the rest of the world. Switch 10 is used to choose between the two. A book of codes is provided, there being a three digit code for each alphabetically listed location. These codes are entered into the device by means of the "roll digit" switch 8 and the "enter" switch 9, the digits being displayed in panels 7. The three digit code results in information being supplied from the location ROM identifying the location by means of latitude and longitude; the number of digits might be as high as twelve.

The microprocessor then operates on the information supplied from the location ROM and from the calendar, to determine prayer times. This is done by reference to sunrise and sunset times which can be calculated in accordance with one or more suitable algorithms. It is felt that three separate algorithms will generally be necessary, namely to calculate the earth's axial tilt angle to the plane of the earth's orbit about the sun, from the calendar; to calculate sunrise time from the tilt angle and latitude/longitude; and to calculate sunset time from the tilt angle and latitude/longitude. Suitable algorithms are available from astronomical sources. The prayer times are then calculated.

At a suitable interval in advance of any one of the prayer times, say 20 minutes, the microprocessor produces an output in the form of, say a single "bleep" which is amplified by an AMPLIFIER whcih drives a suitable transducer T giving an audible output. Tone generation of this sort for alarm purposes is well known in the art. At 15, 10 and 5 minutes in advance of a prayer time different outputs are given, for example the number of "bleeps" increasing. At prayer time a special output is provided, for example a particular series of notes, a synthesised prayer chant or the like. Thus, throughout the day warning will be given of prayer time, and then the time for prayer itself indicated.

It will be appreciated that calculation of prayer times is continuous and automatic. Once a location has been entered the microprocessor will continuously calculate prayer times in accordance with the output from the clock/calendar, since the times change from day to day.

The microprocessor also cooperates with the calendar to activate the appropriate Holy Day flag at the correct time. This will be e.g. at midnight (local time for the location entered) and the flag will stay activated for 24 hours.

Figure 4:
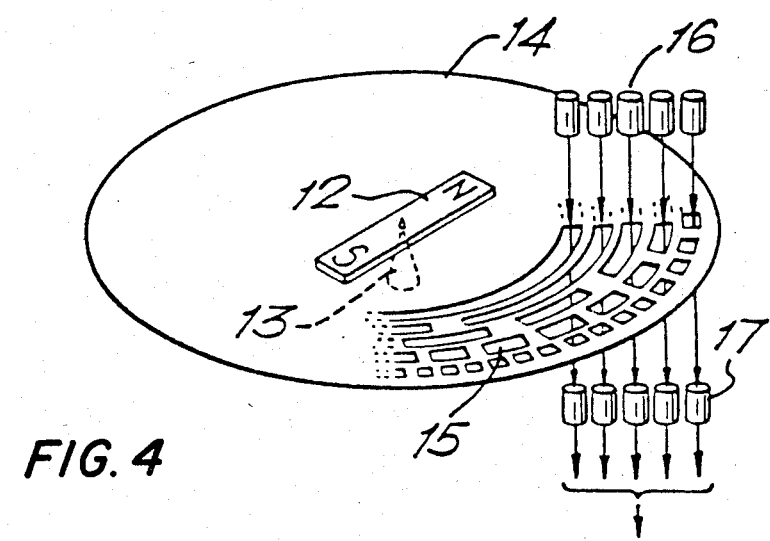
FIG. 4 is a schematic view of a compass employed in the device.

In addition to indicating the time for prayer, the device has means for obtaining the direction towards Mecca, in the form of a compass linked to the microprocessor. This compass is shown schematically in FIG. 4 and includes a magnet 12 rotatably mounted on a pivot 13 in conventional manner. The magnet is attached to a disc 14, e.g. of plastic, which is rotatable with the magnet. This disc is provided with series of arcuate slots 15 defining grey code. A series of five light sources 16 such as light emitting diodes is provided, one for each line of slots. With each LED is associated a recieved 17 such as a phototransistor. The LED's and phototransistors are fixed relative to the device whilst the disc 14 is of course rotatable. The outputs from the various phototransistors, which are fed to the microprocessor, vary as the disc rotates and the signal at any given time is indicative of the angular position of the disc.

The microprocessor calculates the deviation from magnetic north to the direction towards Mecca, for any location which is entered. The microprocessor may take into account the variation of magnetic north over a period of years, using information from the calendar although such changes may not be singificant over the life of the device. To indicate the direction towards Mecca for a user, the device gives an audible output Mecca for a user, the device gives an audible output via the amplifier and transducer T when the longitudinal edges of the device point in the correct direction with the top of device towards Mecca. This will be when the output from the phototransistors show the required part of disc 14 to be aligned with them, representing the correct angular deviation from mangetic north. Thus a user simply rotates the device until the correct audible output is received. Three different tones may be output, one indicating that the device needs to be rotated clockwise, one that it needs to be rotated anticlockwise, and one that it is correctly aligned. A switch may be provided to activate the compass circuitry when required, or it may be automatic and operate only when the count-down to prayer time is initiated.

The accuracy of the clock/calendar is crucial to the device and desirably it should be reset at say 6 monthly intervals, the periods being indicated by panel 6. This is done by feeding suitable modulated signals through transducer T, operating as a microphone rather than a loudspeaker, which are demodulated and used to reset the clock/calendar. The signals may be provided via the telephone from a central number which a user dials.

During battery replacement, the clock calendar may be kept operative by means of a large capacitor acting as a supply for say five minutes. If the clock stops, however, it can be reset using the above procedure.

It will be appreciated that in the preferred embodiment there is provided a pocket sized device which is simple to operate and convenient, and which has the unique features of indicating the direction towards Mecca and the times of prayer for Moslems, for any location in the world.

It will further be appreciated that the device discussed in this specification embodies a number of principles which are in themselves inventive, such as:- means for automatically altering time with respect to a reference time, in accordance with a geographical location entered; this could be embodied in a multi time-zone watch or clock to avoid manual resetting; and means for indicating the direction towards a predetermined point once present location is entered; this could be used in many applications and one could for example have the facility to vary the predetermined location. An important feature of the preferred device is that it is not simply a receiver of information: it positively calculates factors related to time and/or direction.

In the preferred embodiment, the device calculates the time in absolute time, determined by the time base, of a point in local time for the location entered. Possibly, however, the device could first calculate local time and work from that.

We claim:

1. A portable information device comprising means for establishing a time base; means for entering information identifying any one of a plurality of geographical locations; means associated with the time base establishing means and the information entering means for determining one or more points in time having a predetermined temporal relationship to the occurrence, at the location entered, of one or more natural physical events the time of which is dependent on geographical location; means for providing an output at the time determined; and means associated with the information entering means for providing a signal indicative of the deviation from a basic terrestial direction of the direction from the location entered towards a predetermined location; wherein there are provided magnetic compass means for ascertaining the basic terrestial direction, disc encoding means defining plurality of arcuate slots associated therewith and plurality of light sources and receivers associated with the disc encoding means and with the deviation indicative signal to provide an output serving as a pointer towards the predetermined location.

2. A device as claimed in claim 1 wherein the time base establishing means is a continuously operating clock-calendar providing output signals indicative of time and date with respect to a base.

3. A device as claimed in claim 1 wherein the information entering means includes means for the manual input of a predetermined code identifying one of a plurality of locations, and means providing output signals indicative of the co-ordinates of the selected location on the earth's surface.

4. A device as claimed in claim 1, wherein the physical events are sunrise and sunset.

5. A device as claimed in claim 4 wherein the points in time are Moslem prayer times.

6. A device as claimed in claim 1 wherein the output is an alarm.

7. A device as claimed in claim 1, wherein the magnetic compass means for ascertaining the basic terrestial direction determines the direction of Magnetic North.

8. A device as claimed in claim 5 wherein the predetermined location is Mecca.

9. A device as claimed in claim 1 wherein time calculations are performed on absolute time determined by the time base irrespective of local time.

10. A device as claimed in claim 1 wherein the means providing the deviation indicative signal calculates the true deviation of the direction from the basic terrestial direction.

11. A device as claimed in claim 1 wherein the output serving as a pointer is an audible signal when the device is oriented towards the predetermined location.

12. A device as claimed in claim 1 wherein the disc encoder is attached to a needle of the magnetic compass means, the disc encoder defining a plurality of arcuate slots defining a grey code; the plurality of light sources are each aligned with one of the arcuate slots, and further comprising a plurality of light receivers aligned with the arcuate slots so as to selectively receive light from the light sources.

13. A device as claimed in claim 12 wherein the plurality of light sources comprise light emitting diodes.

14. A device as claimed in claim 13, wherein the plurality of light receivers comprise phototransistors.

15. A portable information device comprising means for entering information identifying any one of a plurality of geographical locations; means associated with the information entering means for providing a signal indicative of the deviation from a basic terrestial direction of the direction from the location entered towards a predetermined location; magnetic compass means for ascertaining the basic terrestial direction; disc encoding means defining plurality of arcuate slots associated therewith and a plurality of light sources and receivers associated with the disc encoding means and with the deviation indicative signal, to provide an output serving as a pointer towards the predetermined location.

16. A device as claimed in either of claims 1 or 15 wherein the output serving as a pointer is given when a fixed reference direction on the device points towards the predetermined location.

17. A device as claimed in claim 15, wherein the magnetic compass means for ascertaining the basic terrestial direction determines the direction of Magnetic North.

18. A device as claimed in claim 15 wherein the predetermined location is Mecca.

19. A device as claimed in claim 15, wherein the information entering means includes means for the manual input of a predetermined code identifying one of a plurality of locations, and means providing output signals indicative of the co-ordinates of the selected location on the earth's surface.

20. A device as claimed in claim 15 wherein the means providing the deviation indicative signal calculates the true deviation of the direction from the basic terrestial direction.

21. A device as claimed in claim 15 wherein the output serving as a pointer is an audible signal when the device is oriented towards the predetermined location.

22. A device as claimed in claim 15 wherein the disc encoder is attached to a needle of the magnetic compass means, the disc encoder defining a plurality of arcuate slots defining a grey code; the plurality of light sources, are each aligned with one of the arcuate slots; and further comprising a plurality of light receivers aligned with the arcuate slots so as to selectively receive light from the light sources.

23. A device as claimed in claim 22 wherein the plurality of light sources comprise light emitting diodes.

24. A device as claimed in claim 14, wherein the plurality of light receivers comprise phototransistors.

* * * * *

UNITED STATES PATENT AND TRADEMARK OFFICE
CERTIFICATE OF CORRECTION

PATENT NO. : 4,512,667
DATED : April 23, 1985
INVENTOR(S) : DOULTON et al.

It is certified that error appears in the above-identified patent and that said Letters Patent is hereby corrected as shown below:

| | |
|---|---|
| Claim 1, Col. 11, line 31: | insert -- a -- between "defining" and "plurality"; |
| Claim 1, Col. 11, line 32: | before "plurality", insert -- circuitry including a --; |
| Claim 1, Col. 11, line 33: | after "disc encoding means" insert -- such circuitry being further associated --; |
| Claim 1, Col. 11, line 33: | delete "and"; |
| Claim 15, Col. 12, line 24: | insert -- a -- between "defining" and "plurality"; |
| Claim 15, Col. 12, line 25: | before "a plurality" insert -- circuitry including --; |
| Claim 15, Col. 12, line 26: | after "disc encoding means" insert -- such circuitry being further associated -- |

UNITED STATES PATENT AND TRADEMARK OFFICE
CERTIFICATE OF CORRECTION

PATENT NO. : 4,512,667
DATED : April 23, 1985
INVENTOR(S) : Doulton et al

It is certified that error appears in the above-identified patent and that said Letters Patent is hereby corrected as shown below:

Claim 15, Col. 12, line 26: delete "and".

*Signed and Sealed this*

*Twenty-seventh* Day of *August 1985*

[SEAL]

*Attest:*

DONALD J. QUIGG

*Attesting Officer*     *Acting Commissioner of Patents and Trademarks*